(12) United States Patent
Rodenkirch

(10) Patent No.: US 11,465,775 B2
(45) Date of Patent: Oct. 11, 2022

(54) LOADER FOR AIRCRAFT

(71) Applicant: JBT AeroTech Corporation, Chicago, IL (US)

(72) Inventor: Mark James Rodenkirch, Groveland, FL (US)

(73) Assignee: JBT AeroTech Corporation, Chicago, IL (US)

( * ) Notice: Subject to any disclaimer, the term of this patent is extended or adjusted under 35 U.S.C. 154(b) by 100 days.

(21) Appl. No.: 16/794,026

(22) Filed: Feb. 18, 2020

(65) Prior Publication Data
US 2020/0198802 A1    Jun. 25, 2020

Related U.S. Application Data

(62) Division of application No. 15/752,491, filed as application No. PCT/US2015/045508 on Aug. 17, 2015, now abandoned.

(51) Int. Cl.
*B64F 1/32*     (2006.01)
*B65G 39/04*    (2006.01)
*B65G 69/22*    (2006.01)

(52) U.S. Cl.
CPC .............. *B64F 1/322* (2020.01); *B65G 39/04* (2013.01); *B65G 69/22* (2013.01); *B65G 2814/0398* (2013.01)

(58) Field of Classification Search
CPC . B64F 1/322; B65G 2814/0398; B65G 39/04; B65G 69/22; B64D 2009/006
(Continued)

(56) References Cited

U.S. PATENT DOCUMENTS 2,822,073 A  *  2/1958  Payne ................... B65G 39/025
                                              193/35 MD
3,361,440 A       1/1968  Green
(Continued)

FOREIGN PATENT DOCUMENTS

DE           523566 A1    1/1986
FR           2031709      11/1970
WO       2011/142835 A1  11/2011

OTHER PUBLICATIONS

International Search Report and Written Opinion dated Jul. 27, 2016, issued in corresponding International Application No. PCT/US2015/045508, filed Aug. 17, 2015, 17 pages.
(Continued)

*Primary Examiner* — Mark C Hageman
(74) *Attorney, Agent, or Firm* — Christensen O'Connor Johnson Kindness PLLC

(57) ABSTRACT

An aircraft loader 54 includes an upper loading platform 50 and an underlying frame 52 with the frame utilizing the bogey suspension system 60, as well as carrying auxiliary lift system 400 at the rearward end thereof for assisting in the initial lifting of the platform relative to the frame. Powered roller assemblies 100, 110, 120, and 130, composed of hollow drive shafts, may be conveniently assembled and disassembled from the underside of loading platform 50. A plurality of upwardly convex-shaped static slider elements 200 facilitate unidirectional movement of loads on the platform 50. At the forward end of the platform, a guard or side rail 316 is rotatable from a retracted position within the confines of a control platform 68 to a forwardly directed position toward the fuselage of the aircraft. The side rail 316 is shaped to resemble the exterior cross-sectional shape of the fuselage, thereby to close the gap between the
(Continued)

forward end of the loading platform and the fuselage, for the protection of loader personnel.

16 Claims, 15 Drawing Sheets

(58) Field of Classification Search
USPC .......................................... 193/35 md, 35 ss
See application file for complete search history.

(56) References Cited

U.S. PATENT DOCUMENTS

| | | | | |
|---|---|---|---|---|
| 3,666,127 A | * | 5/1972 | Guyaux | B66F 7/0625 |
| | | | | 414/495 |
| 4,527,810 A | | 7/1985 | Nielsen | |
| 4,706,793 A | * | 11/1987 | Masciarelli | B65G 47/54 |
| | | | | 193/35 A |
| 5,664,796 A | | 9/1997 | Huyzers | |
| 6,019,211 A | * | 2/2000 | Masciarelli, Jr. | B65G 13/065 |
| | | | | 193/35 MD |
| 6,129,195 A | * | 10/2000 | Matheny | B65G 13/00 |
| | | | | 193/35 A |
| 6,164,429 A | * | 12/2000 | Masciarelli, Jr. | B65G 13/12 |
| | | | | 193/35 SS |
| 7,618,227 B2 | | 11/2009 | Smith | |
| 9,132,907 B2 | * | 9/2015 | Huber | B64C 1/20 |
| 9,790,030 B2 | * | 10/2017 | Sharratt | B62B 15/00 |
| 9,963,232 B2 | * | 5/2018 | Rajeev | B64C 1/20 |
| 9,994,270 B2 | | 6/2018 | Blevins | |
| 10,351,242 B2 | * | 7/2019 | Harden | B64D 9/00 |
| 10,946,965 B2 | * | 3/2021 | Hamm | B65G 13/11 |
| 2010/0178143 A1 | | 7/2010 | Smith | |

OTHER PUBLICATIONS

Communication Pursuant to Article 94(3) dated Sep. 9, 2019, issued in corresponding European Application No. 15754396.8, filed Aug. 17, 2015, 6 pages.

First Chinese Office Action dated Nov. 26, 2020, issued in corresponding Application No. 201580083554.5, filed Aug. 17, 2015, 14 pages.

* cited by examiner

LOADER FOR AIRCRAFT

CROSS-REFERENCES TO RELATED APPLICATIONS

This application is a division of U.S. patent application Ser. No. 15/752,491, filed Feb. 13, 2018, which is a national stage of International Patent Application PCT/US2015/045508, filed Aug. 17, 2015, the contents of both of which applications are expressly incorporated herein by reference in their entirety.

BACKGROUND

The present invention pertains to loader systems for loading and unloading cargo and other loads from aircraft. Aircraft loaders may include a loading platform (also "cargo platform" or "lift platform") that is coupled to an underlying frame by a pair of scissors arms. Hydraulic cylinders may typically act between connection locations on the scissors arm and the underlying frame. Although this arrangement is simple and locates the lift cylinders below the loading platform so that the top conveying surface of the loading platform is unobstructed, when the platform is fully lowered and the scissors arms are folded down, this causes the lift cylinders to be lowered into a substantially horizontal position. In such position, the lift cylinders, being horizontally disposed, do not have the capacity to impose a significant lifting force on the scissors. This may be addressed by utilizing vertical mounted, relatively short, helper cylinders. The helper cylinders act between the frame and the loading platform to provide a relatively high pushing force against the loading platform when the loading platform is in fully lowered position. However, such helper cylinders either have a relatively short total stroke or are of multi-stage construction, which are relatively expensive.

Typical aircraft loaders must be moved from place to place about an airport. Sometimes the loaders must be driven over relatively long distances at high speeds and over rough surfaces. Because in a typical aircraft loader the support wheels are mounted to the loader frame with solid axis, there is no suspension system between the wheels and the loader frame. As a consequence, significant shock loads are imposed on the loader frame during the travel of the loader about an airport. Moreover, the loader driver can experience discomfort during the aircraft loader travel.

Aircraft cargo is typically transported in containers or on pallets, referred to as Unit Load Devices (ULDs). During the loading and unloading processes, the ULDs are conveyed over the surface of the loading platform. The ULDs are moved longitudinally along the platform, laterally of the platform, and/or rotated relative to the platform so as to position the ULDs in correct location and orientation relative to the cargo hold opening and also relative to ground equipment used to place the ULDs on the loader or receive the ULDs. Various types of powered conveying systems are used to move the ULDs forward, backward, laterally, or rotationally. In this regard, powered rollers may be mounted beneath the upper surface of the loading platform. Such rollers may consist of several rolling elements mounted on a drive shaft extending laterally across the platform. In lieu of a simple roller, other types of rollers may be used; for example, a HELIROLL® multi-directional roller, manufactured by Applicant's assignee. The HELIROLL® multi-directional roller is able to move a container, pallet, or other load in multiple directions depending on the operation of the roller. Such rollers are also mounted spaced apart from each other or along a transverse support and driven shaft. Heretofore, loading platforms were not able to accommodate different types of rollers very easily. Moreover, changing from one type of roller to another was a difficult and costly process.

The conveying surfaces of aircraft loaders, in addition to being equipped with powered elements noted above, typically also include non-powered elements; for example, free rollers, casters and/or ball mats. Free rollers have a single conveying axis, whereas casters and ball mats allow conveyance in 360 degrees. A caster is typically a free-swiveling wheel mounted "upside down," with the wheel disposed upwardly to support the ULD for multi-directional conveyance. However, casters can skew the ULD as the caster swivels into the desired direction. Also, casters are quite tall, which can interfere with the structural elements supporting the conveying surface and may limit spacing of the casters about the cargo platform. In addition, because the swivel wheel needs to rotate about a vertical axis, casters require a relatively large opening in the conveying surface, which creates a potential catch point for ULDs, as well as a hazard for personnel walking on the cargo platform surface.

Ball mats are typically in the form of a relatively large stainless steel ball supported by smaller ball bearings in a half-round, cup-shaped housing, thereby allowing for multi-directional conveyance of the ULD. Ball mats have the advantage of being relatively shallow and do not skew the cargo, nor require large openings in the conveying surface. However, ball mats have a small contact point with the underside of the ULD, creating high level local loads and wear on the bottom of the ULDs. In addition, ball mats frequently collect dirt and debris in the cup housing, which can restrict the rotation of the ball bearings and subsequently prevent the main ball from freely turning.

In addition, casters and ball mats are susceptible to damage from heavy and irregular shaped cargo or from equipment such as forklifts used to position ULDs and other cargo on the surface of the cargo platform. Moreover, both casters and ball mats contain multiple moving parts which frequently get contaminated, damaged, or worn, causing malfunction which impedes the smooth transfer of ULDs and may also damage the ULDs.

In a further aspect of aircraft loader systems, it is necessary to keep loading personnel safe during the cargo loading and unloading processes. In this regard, aircraft cargo doors exist both above and below the water line of an aircraft fuselage. The fuselage does not have a straight or consistent common (straight and/or flat) surface in which to align the loader system. Further, the fuselage surface is typically in the form of a compound curve. As such, the cargo loader does not make uniform contact with the fuselage. Nonetheless, during the loading and unloading of aircraft, personnel must enter and exit the aircraft from the cargo loader. Typically, handrails and other protective devices are used to protect personnel from falling from the loader. However, heretofore, due to the varying shapes of aircraft fuselages, often a gap exists between the handrails and the fuselage, wherein personnel are not protected from falling off the loader.

The foregoing drawbacks or limitations of current aircraft loaders are sought to be addressed by the various aspects of the present disclosure.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An aircraft loader for transferring loads into and out of an aircraft includes a ground-engaging frame and a loading platform adapted to raise and lower relative to the frame. The loading platform defines an upper deck having a top surface. In addition, a plurality of static upwardly concave cargo slider elements are disposed on the upper deck to project above the top surface of the upper deck, thereby to support loads carried by the loading platform and also to facilitate movement of loads about the loading platform.

In a further aspect of the present disclosure, the upwardly convex cargo slider elements comprise an upper surface disposed substantially parallel to the top surface of the upper deck of the loading deck, thereby to define a bearing surface for bearing against loads being transferred.

In accordance with a further aspect of the present disclosure, the cargo slider elements are in the shape selected from the group including a truncated dome, a truncated dome with a base, a truncated cone, and a truncated cone with a base.

An aircraft loader for transferring loads into and out of an aircraft includes ground-engaging frame and a loading platform adapted to raise and lower relative to the frame. The loading platform includes side portions and a forward end portion, with the forward end portion positionable adjacent an aircraft fuselage when the aircraft loader is in use. A retractable side guardrail is located along the side portion of the loading platform. The side guardrail is rotatable between a stowed position and an extended position, wherein the guardrail extends forwardly relative to the loading platform. The side guardrail, when in extended position, is shaped to correspond to the exterior circumferential shape of the aircraft fuselage below the waterline of the fuselage.

In the aircraft loader, the guardrail extends downwardly and forwardly relative to the loading platform to simulate the exterior circumferential shape of the aircraft fuselage adjacent the side guardrail.

An aircraft loader for transferring loads into and out of an aircraft includes a ground-engaging frame and a loading platform adapted to raise and lower relative to the frame. An auxiliary lift system is provided for assisting in the lifting of the loading platform upwardly relative to the frame. The auxiliary lift system includes at least one linear actuator acting between the frame and the lifting platform, and a spring acting between the linear actuator and either the loading platform or the frame.

In the aircraft loading platform, the linear actuator for the auxiliary lift system is mounted on the frame to extend in the upwardly direction toward the loading platform or is mounted on the loading platform to extend downwardly toward the frame. Correspondingly, the spring is mounted on the linear actuator to act against the loading platform or against the frame.

An aircraft loader for transferring loads into and out of an aircraft includes a ground engaging frame and a loading platform adapted to raise and lower relative to the frame. Wheels are provided to support the frame. In addition, a suspension system is interposed between the wheels and the frame. The suspension system includes a swing arm assembly pivotally connected between the wheel and the frame. In addition, a shock absorber acts between the swing arm assembly, with the shock loads imposed on the aircraft loader during travel of the aircraft loader.

A snubber is positioned between the shock absorber and the frame to absorb shock loads transmitted from the wheel to the shock absorber. The snubber is composed of a compressible elastomeric material, for example, natural or synthetic rubber.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The attachments to this application, as well as the detailed description set forth below in connection with the appended drawings, where like numerals reference like elements, are intended as a description of various embodiments of the disclosed subject matter and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order to not unnecessarily obscure various aspects of the present disclosure. Further, it will be appreciated that embodiments of the present disclosure may employ any combination of features described herein.

The present application may include references to directions, such as "forward," "rearward," "front," "back," "upward," "downward," "vertical," "horizontal," "lateral," "transverse," "diagonal," "upright," "right-hand," "left-hand," "in," "out," "extended," "advanced," and "retracted." These references and other similar references in the present application are only to assist in helping describe and understand the present disclosure and invention and are not necessarily intended to limit the present disclosure or invention to these directions.

In the following description, various embodiments of the present disclosure are described. In the following description and in the accompanying drawings, the corresponding systems assemblies, apparatus and units may be identified by the same part number, but with an alpha or other suffix. The descriptions of the parts/components of such systems assemblies, apparatus and units are the same or similar, and therefore are not repeated so as to avoid redundancy in the present application.

Figure 1:
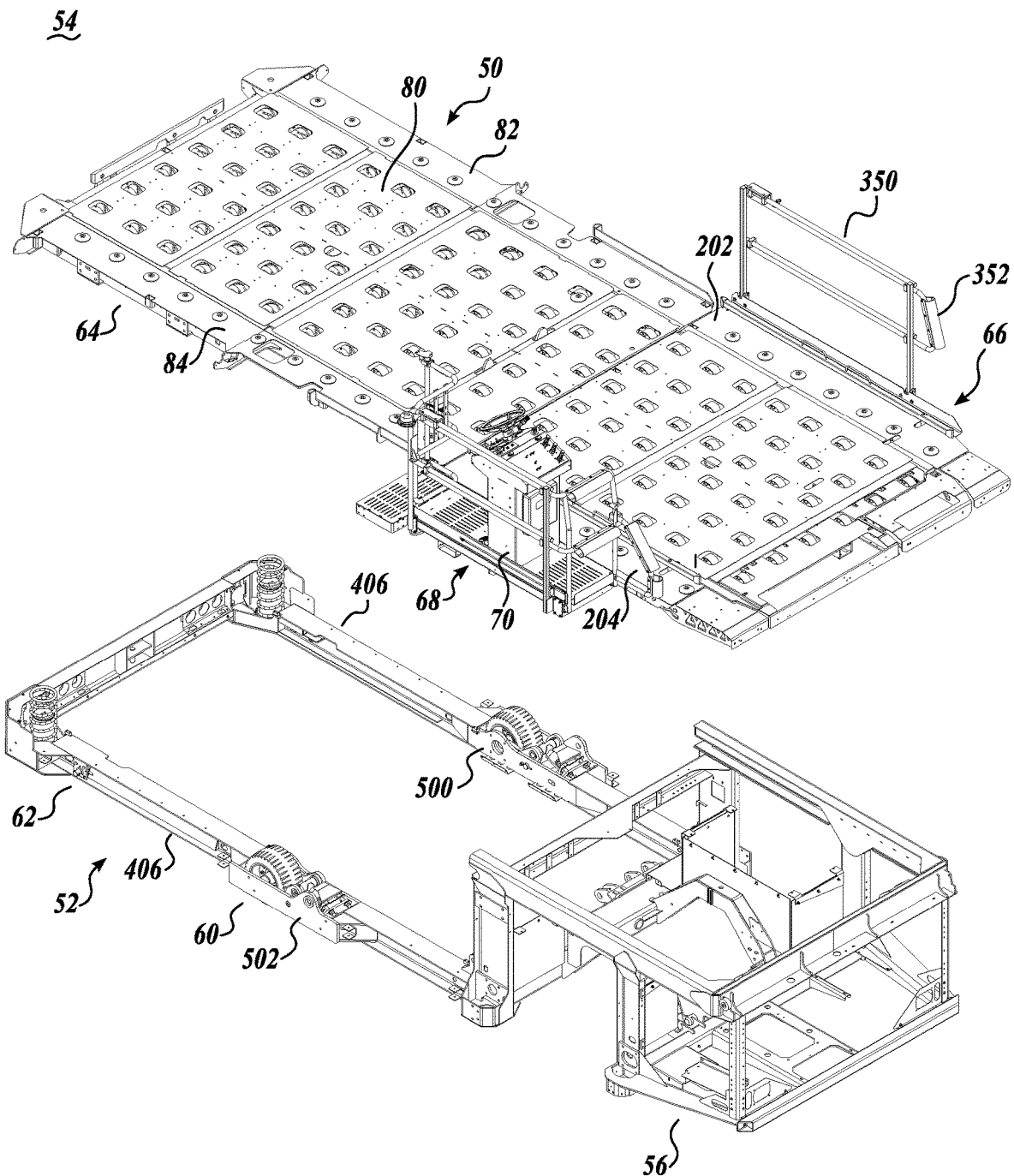
FIG. 1 is an isometric view of an aircraft loader, showing a loading platform separated from and disposed above an underlying frame structure, wherein for clarity the lift structure acting between the frame and loading platform is not illustrated.
Figure 2:
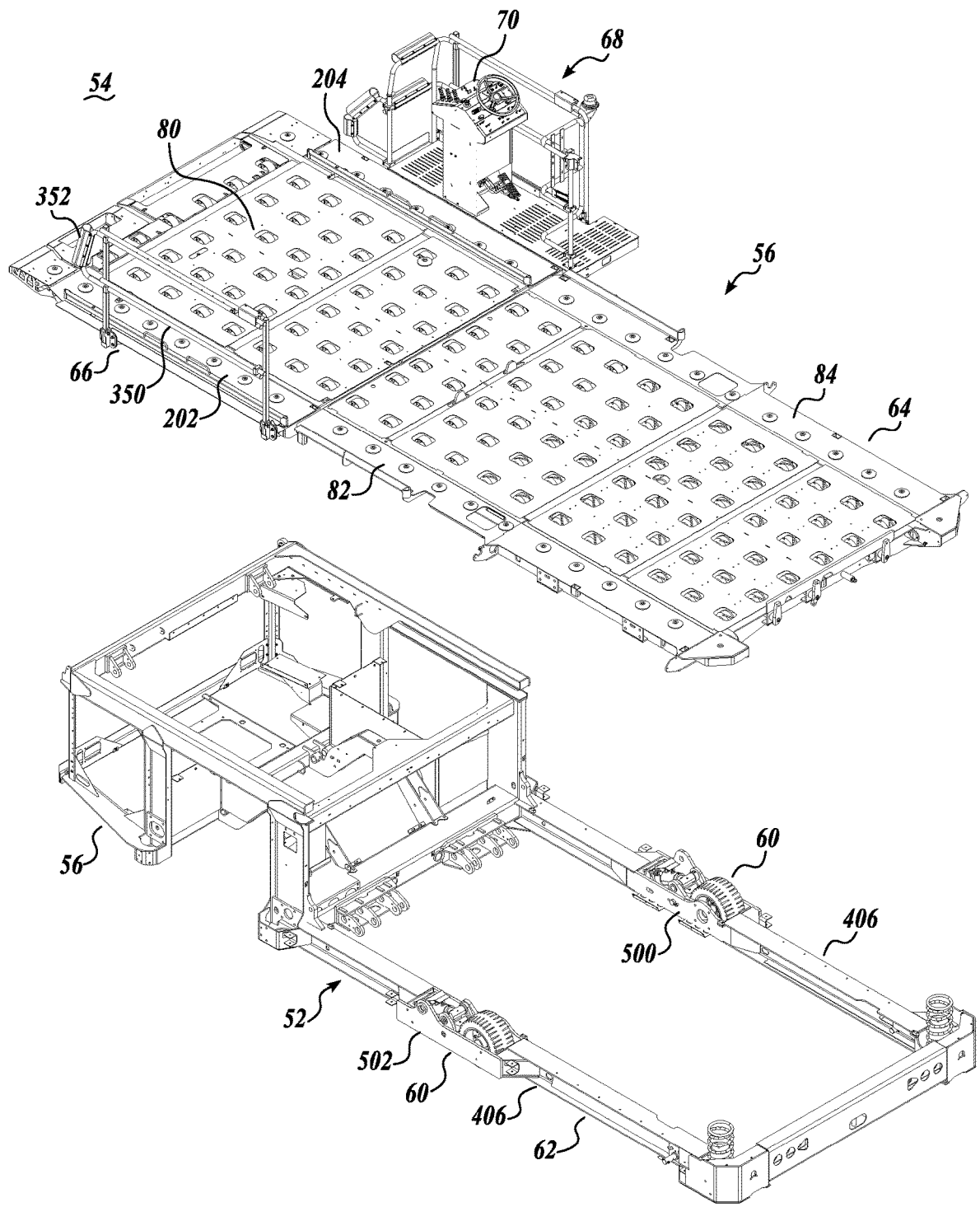
FIG. 2 is a view similar to FIG. 1, but taken from the opposite end of the illustrated aircraft loader.

FIGS. 1 and 2 illustrate the loading platform 50 and the underlying frame structure 52 of an aircraft loader 54 used for transferring loads into and out of an aircraft. A lift system, not shown, is utilized to raise and lower the platform 50 relative to the frame 52. Such lift systems may include, for example, a pair of scissors arms connected between the platform and the frame, with hydraulic cylinders acting on the scissors to extend and retract the scissors arms. An example of such a lift system is disclosed in PCT Publication WO 2011/142835, incorporated by reference herein. The loader may include a drive motor and drive wheels (not shown) incorporated into the forward section 56 of the frame 52. A bogey suspension system 60 supports the rear section 62 of frame 52.

The loading platform 50 is illustrated as including a rear section 64 disposed above frame rear section 62 and a platform forward section 66 disposed above frame forward section 56. A control platform 68 is mounted to one side of the forward platform section 66 to support a control console 70 for operating the aircraft loader. The control platform 68 also serves as a walkway to enable personnel to move along the side of the aircraft loader.

Figure 3:
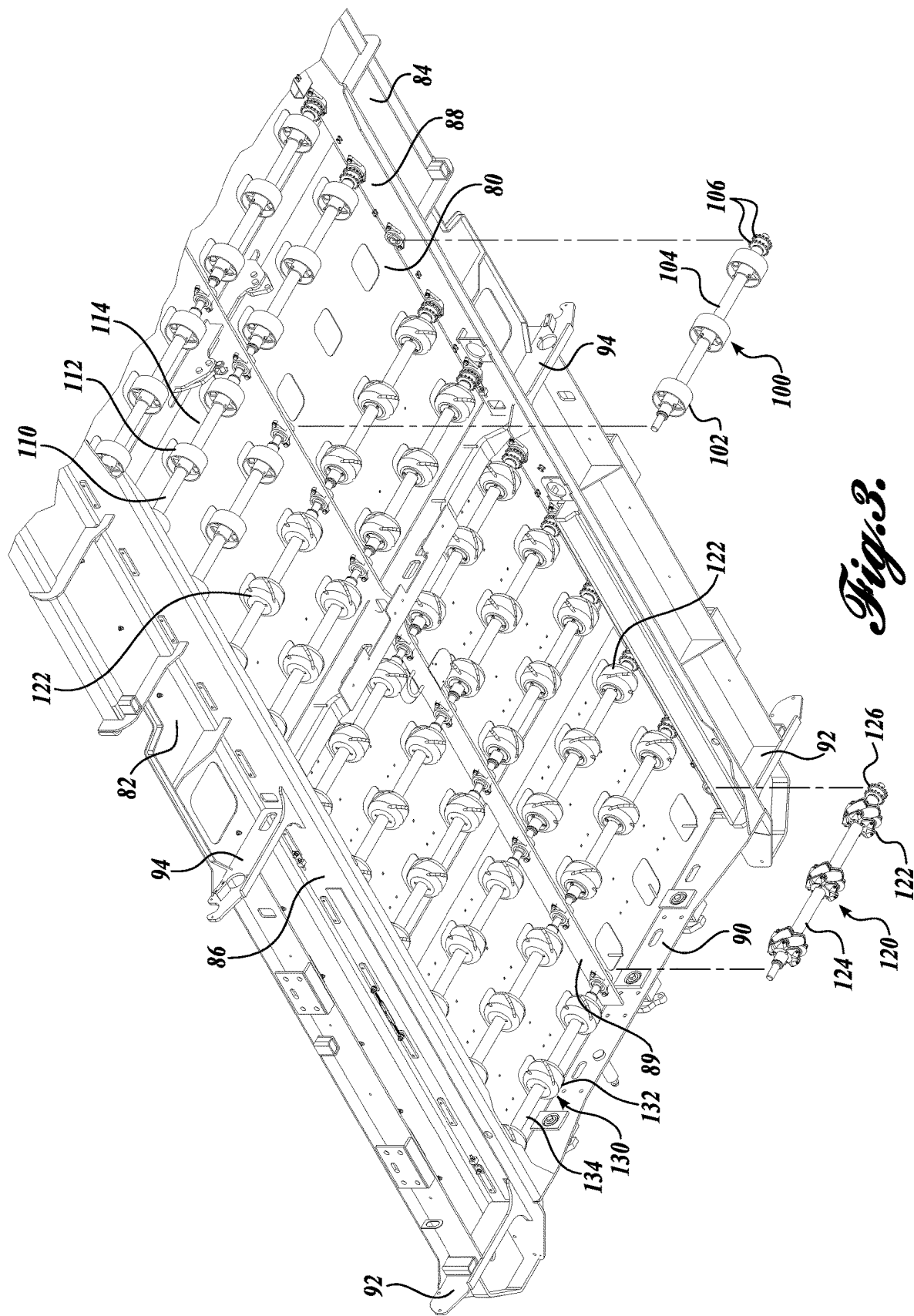
FIG. 3 is a fragmentary view of the underside of the cargo platform of FIGS. 1 and 2, wherein certain roller assemblies are disassembled from the platform.

Describing the foregoing aspects of the aircraft loader 54 in greater detail, platform rear section 64 includes a deck main section 80 and side sections 82 and 84. The main deck section 80 can be composed of several sub-sections, or as a singular unitary section. Referring initially to FIG. 3, the platform rear section 64 includes an underlying support frame composed of side beam structures 86 and 88 tied together at their rear ends by a transverse rear beam structure 90 as well as a front beam structure, not shown. Also, a central longitudinal beam 89 extends parallel to the side sections 82 and 84 along the center of the rear section 64. Such beam structures are securely fixed to the deck main section 80 and side sections 82 and 84. In addition, transverse beam structures may extend laterally outwardly from side beam structures 86 and 88 to provide support for the platform side sections 82 and 84, for example, transverse beam structures 92 and 94, shown in FIG. 3.

Figure 4:
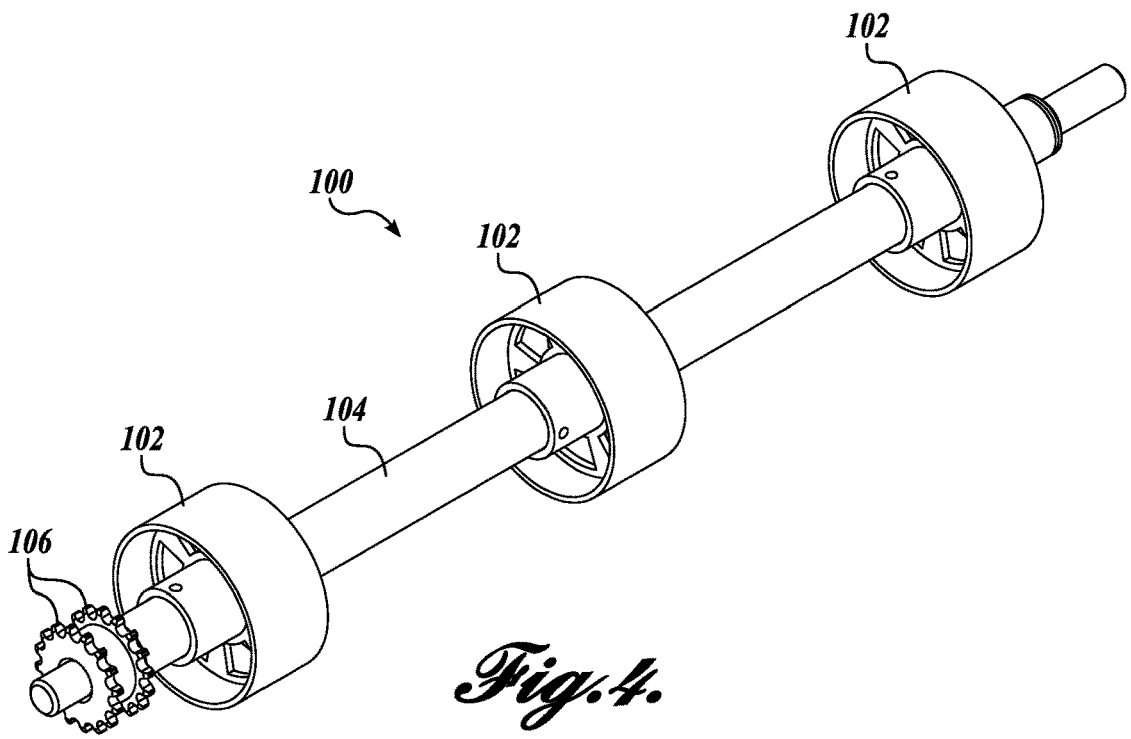
FIG. 4 is an isometric view of one type of roller assembly.
Figure 5:
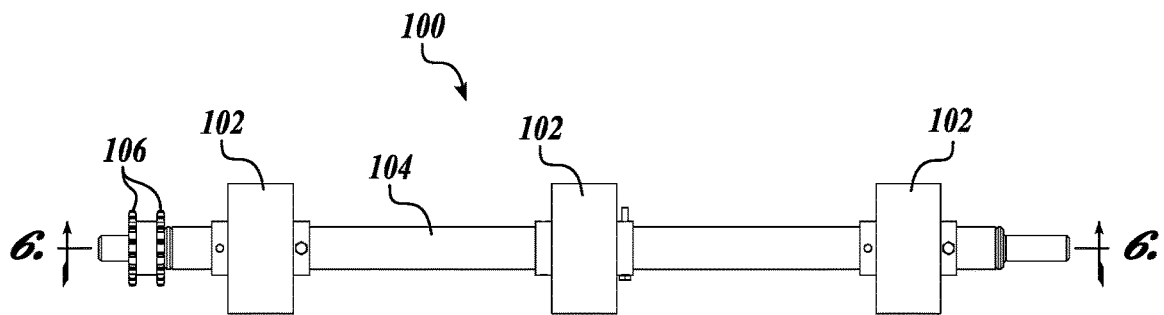
FIG. 5 is an elevational view of FIG. 4.
Figure 6:
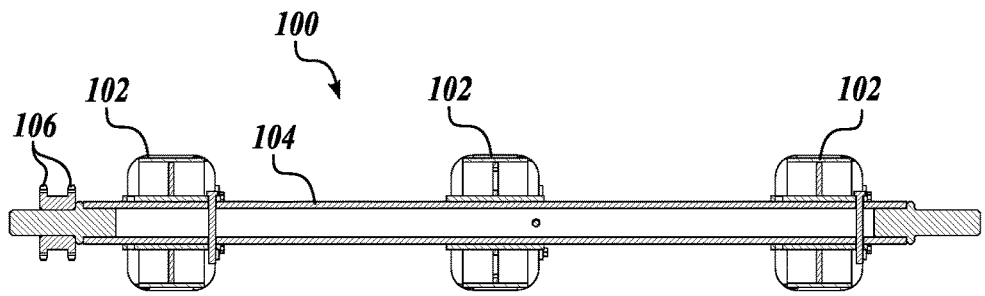
FIG. 6 is a cross-sectional view of FIG. 5, taken substantially along line 6-6 thereof.

Powered roller assemblies of various configurations are mounted beneath the deck main section to project upwardly through openings formed in the deck, thereby to support and move ULDs about the deck when loading or unloading aircraft. FIG. 3 illustrates two basic types of powered roller assemblies, including roller assembly 100, composed of straight standard rollers 102 mounted on a hollow drive shaft 104 having drive sprockets 106 attached to an end thereof adjacent beam 88. See also FIGS. 4, 5, and 6. The roller assembly 100 extends transversely half-way across the deck 80 with a second roller assembly 110 constructed similarly to roller assembly 100 positioned on the other side of the deck. Use of two separate roller assemblies 100 and 110 facilitates assembly of the roller assemblies. Roller assembly 110 also includes rollers 112, a hollow drive shaft 114, and drive sprockets (not shown). The end portions of the hollow drive shafts 104 and 114 are mounted to the frame side beams 86 and 88 and center beam 89 by bearing assemblies having housings or flanges attachable to the beam structures. Such bearing assemblies may take many forms. Nonetheless, by constructing the roller assemblies 100 and 110 with hollow drive shafts and in two sections in the manner shown in FIG. 3, such drive shafts can be conveniently installed or removed from the loading platform 50. Moreover, the hollow drive shaft reduces the weight of the roller assemblies of similar roller assemblies constructed with solid drive shafts, without any significant loss in structural integrity of the roller assemblies or their drive shafts while significantly reducing the rotational mass of the roller assemblies.

Figure 7:
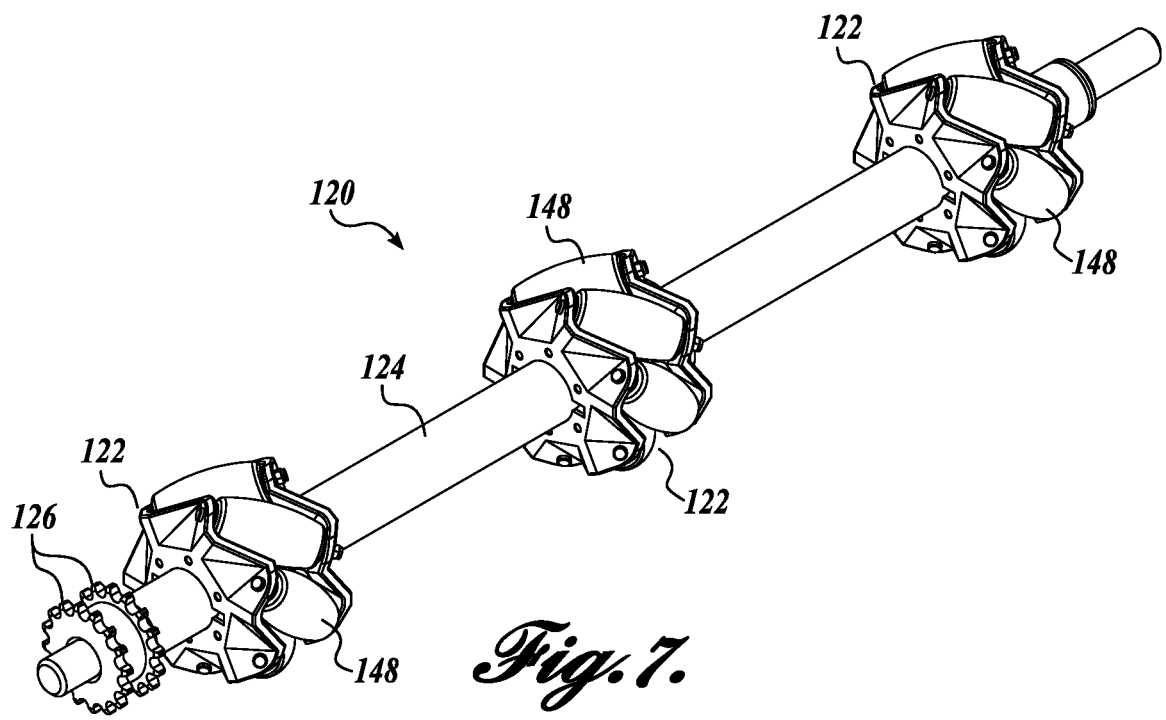
FIG. 7 is an isometric view of another type of roller assembly.
Figure 8:
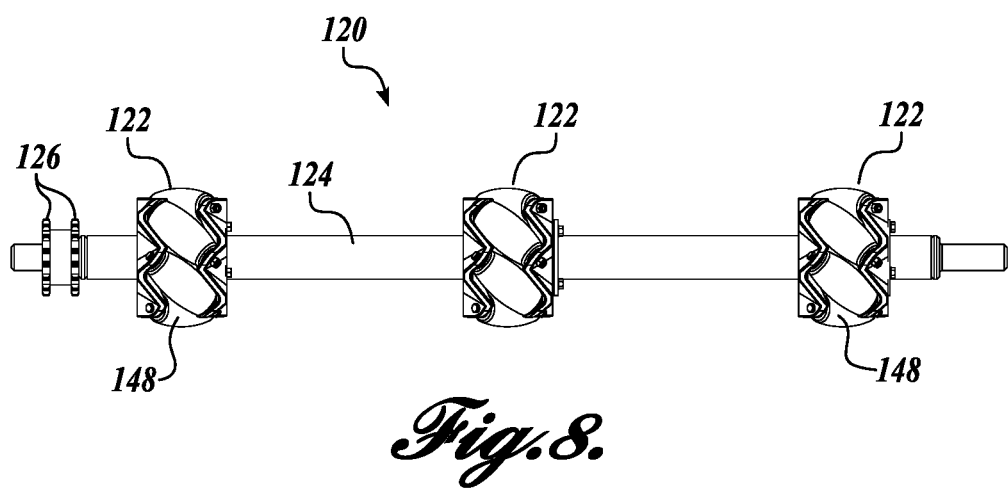
FIG. 8 is an elevational view of FIG. 7.
Figure 9:
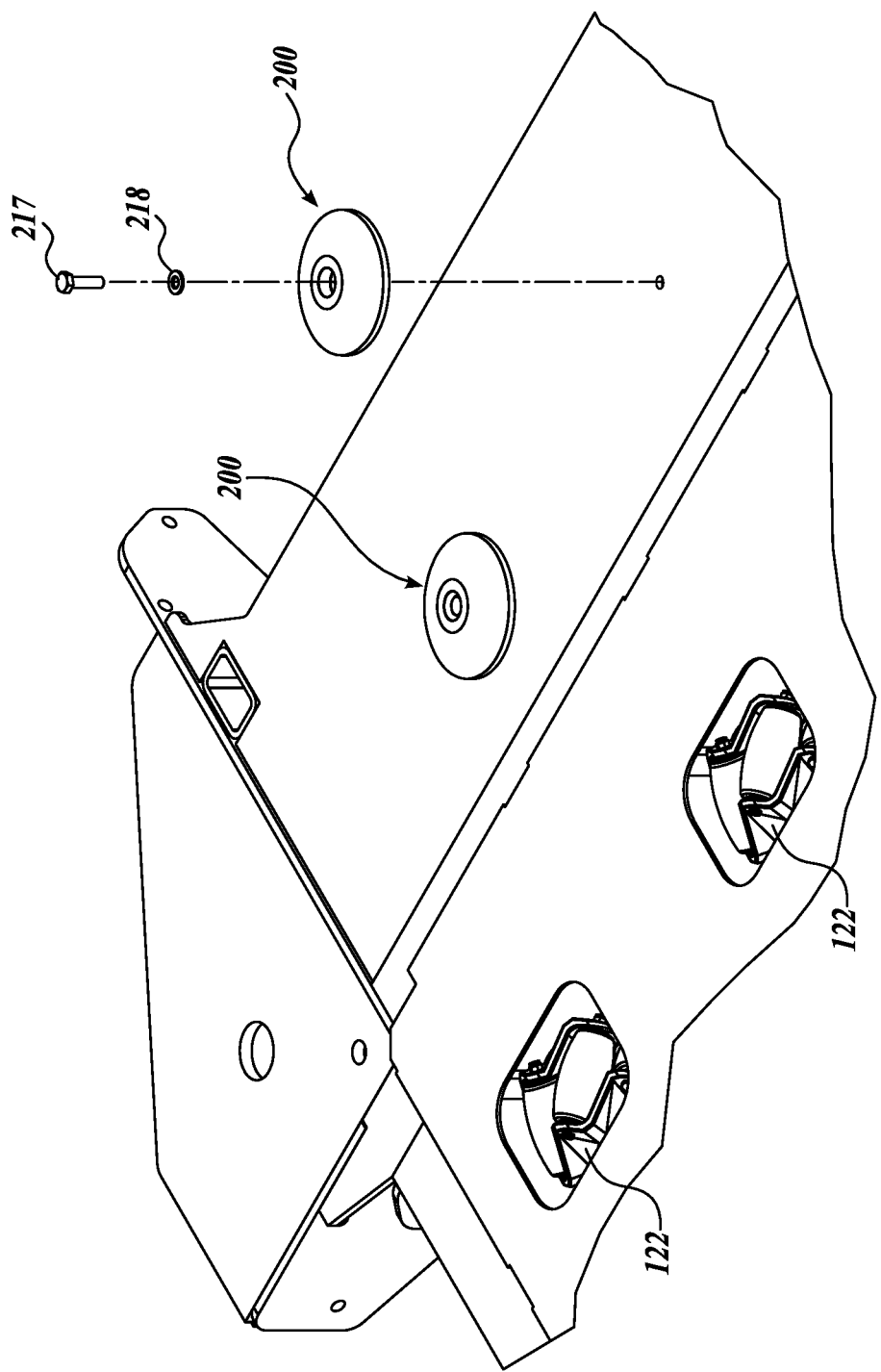
FIG. 9 is an enlarged, fragmentary view of the cargo platform of FIG. 1, illustrating the position of cargo slider elements.

Next, also referring to FIGS. 7 and 8, a second configuration of roller assembly 120 is illustrated. The roller assembly 120 includes a plurality of roller subassemblies 122 mounted on a hollow drive shaft 124 in a manner similar to rollers 102 mounted to drive shaft 104. It is noted that subassemblies 122 are shown schematically in FIGS. 1, 2 and 3. Also similarly, a pair of drive sprockets 126 are mounted to one distal end of the drive shaft 124. The other end of the drive shaft 124 is positioned adjacent roller assembly 130 positioned on the other side of center beam 89 from the location of the roller assembly 120. Roller assembly 130 is constructed similarly to roller assembly 120, including having roller subassemblies 132 mounted on a hollow drive shaft 134, and drive sprockets, not shown. The roller assemblies 120 and 130 are mounted to the underside of deck main section 80 in a manner similar to that described above with respect to roller assemblies 100 and 110. As such, the roller assemblies 120 and 130 may be conveniently installed and removed from the deck section 80.

Referring specifically to FIGS. 7 and 8, roller subassemblies 122 and 132 are each composed of a plurality of generally barrel-shaped rollers 148 mounted in canted or helical fashion so as to impart a rotational force on the underside of the ULDs, thereby causing the ULDs to rotate relative to the platform deck 80. Such roller subassemblies 122 and 132 are articles of commerce, e.g., HELIROLL® multi-directional rollers manufactured by Applicant's assignee. The roller assemblies 120 and 130, as in roller assemblies 100 and 110, enable convenient assembly and disassembly from the loader 54. Moreover, with the drive shafts 124 and 134 being of hollow construction, the overall weight of the roller assemblies 120 and 130 is reduced relative to if the shafts 124 and 134 were of solid construction.

Referring to FIGS. 1, 2, and 9-12, in addition to utilizing powered rollers to move ULDs during the loading and unloading process, the loading platform 50 also includes a plurality of static cargo slider elements 200, which are shown as mounted along the length of the side portions 82 and 84 of platform rear section 64 as well as along side portions 202 and 204 of platform forward section 66. It will be appreciated that the platform forward section 66 may be constructed similarly to platform rear section 64, including utilizing roller assemblies similar to roller assemblies 100, 110, 120, and 130. Moreover, the forward platform section 66 may include an underlying frame structure similar to that described above with respect to rear platform section 64.

Figure 10:
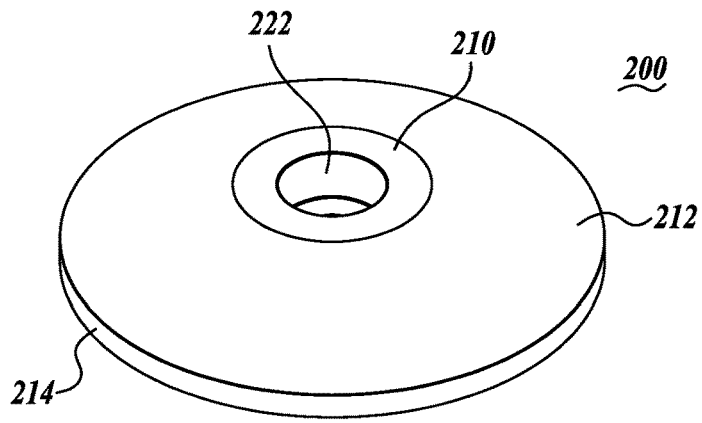
FIG. 10 is an enlarged isometric view of the cargo slider element shown in FIG. 9.
Figure 11:
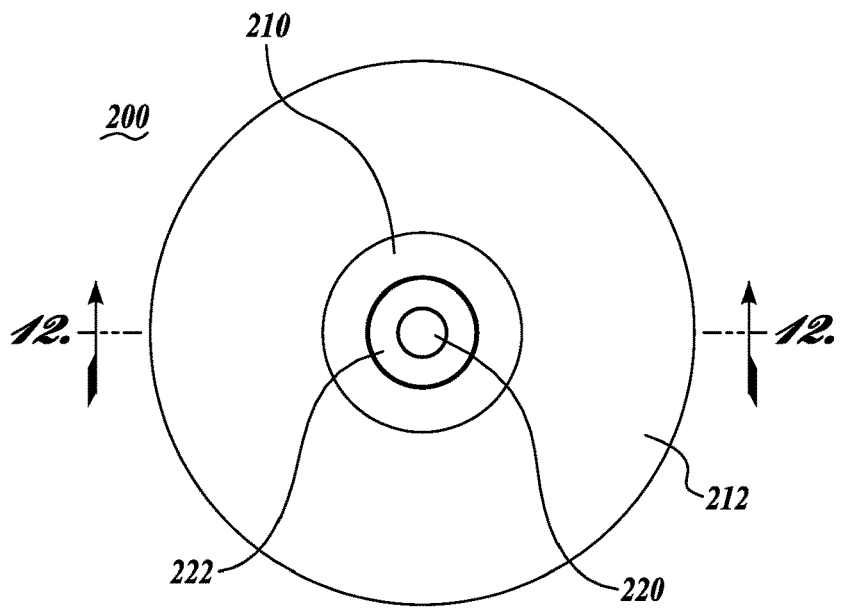
FIG. 11 is a top view of FIG. 10.
Figure 12:
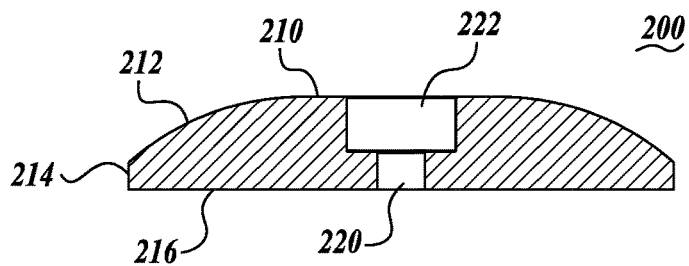
FIG. 12 is a cross-sectional view of FIG. 11, taken along line 12-12 thereof.
Figure 13:
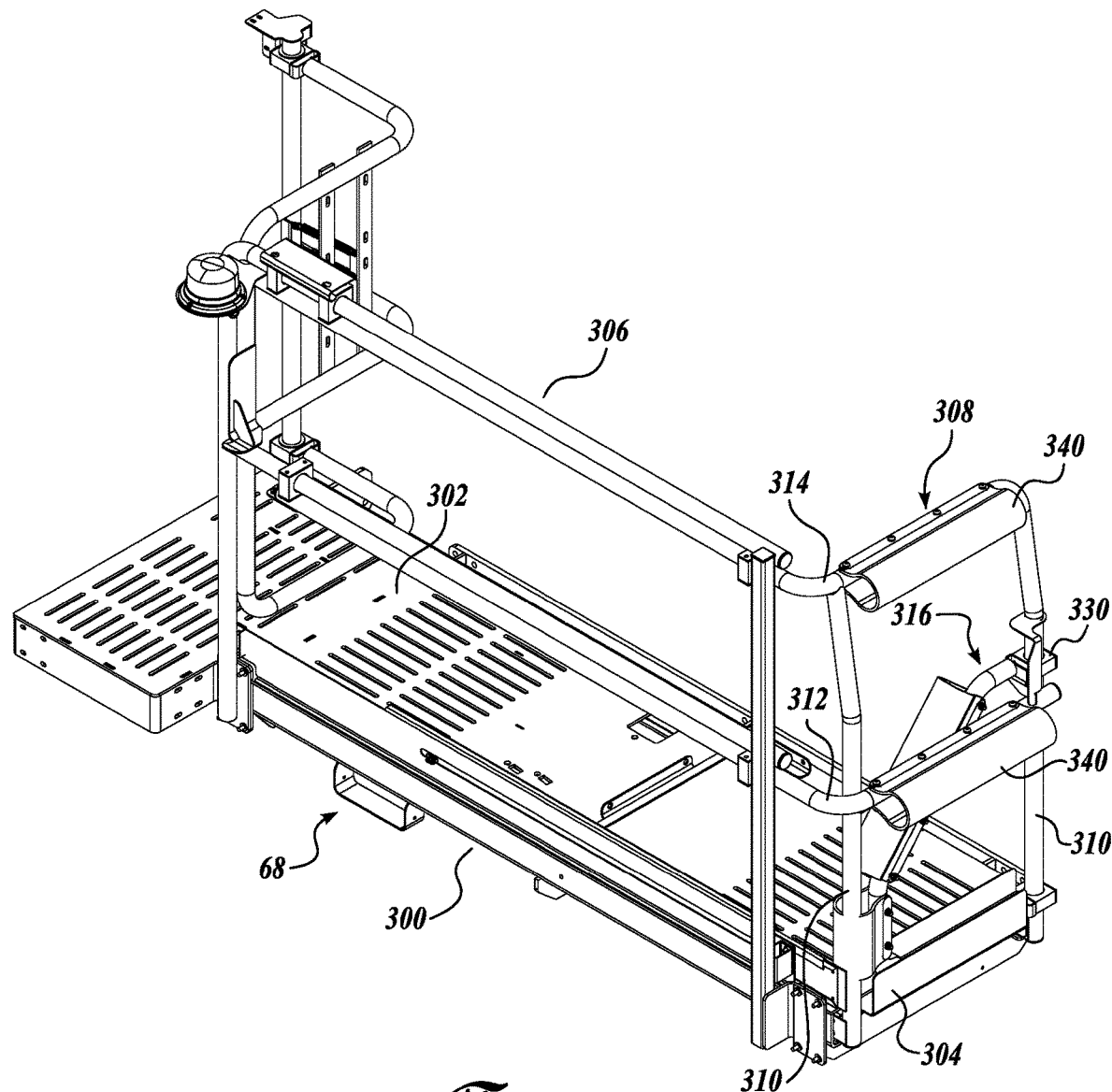
FIG. 13 is an enlarged isometric view of the walkway illustrated in FIGS. 1 and 2.
Figure 14:
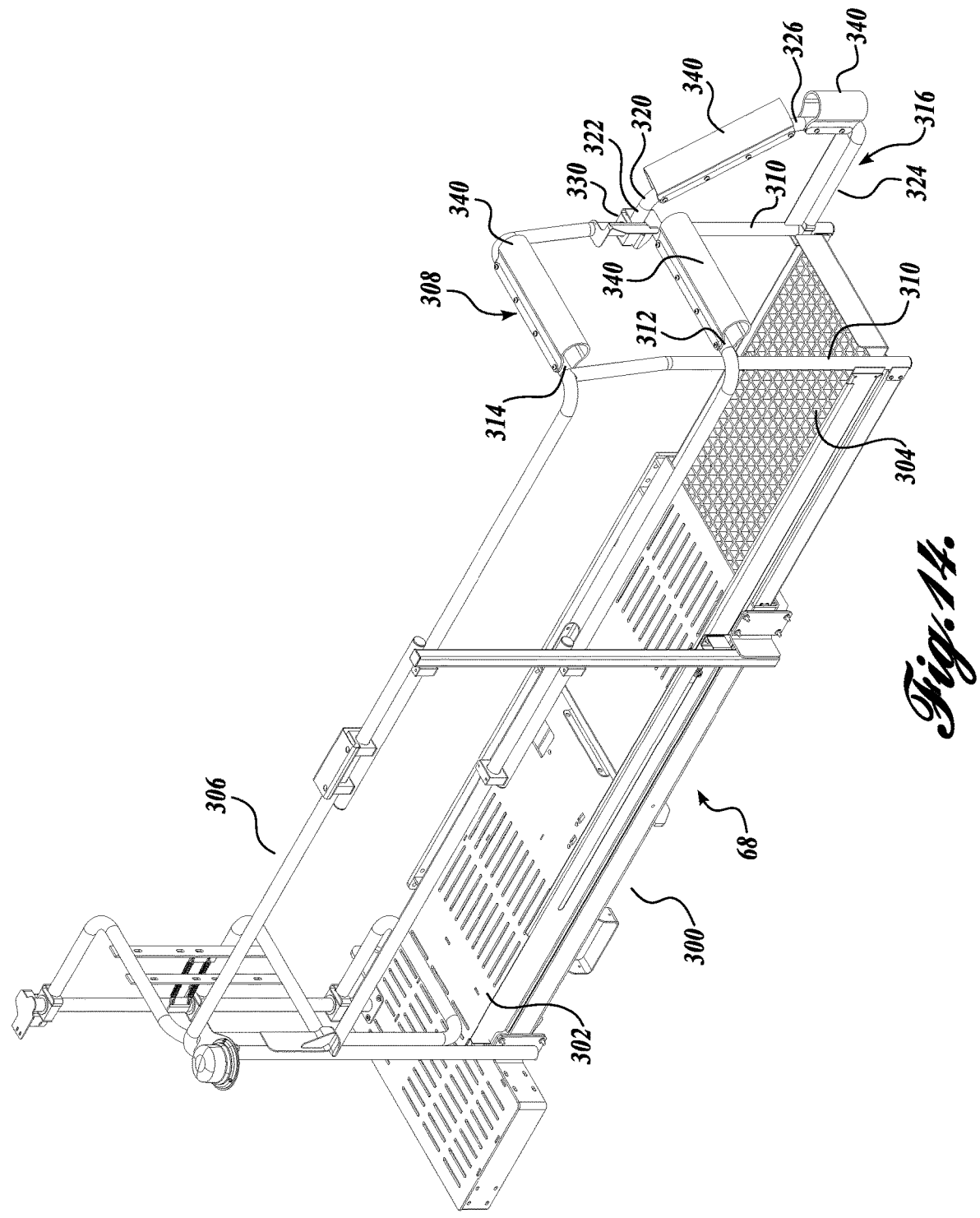
FIG. 14 is an isometric view of the walkway of FIG. 13 shown in extended position.

As shown most clearly in FIGS. 10, 11, and 12, the slider element 200 is upwardly convex in shape, having a substantially flat upper circular surface 210 and downwardly extending side surface 212 that are illustrated as intersecting a vertical base section 214. Although the side surface 212 is shown in the form of a truncated dome, the side surface could be of other shapes, such as with straight sides, in the form of a cone or a truncated cone. Moreover, the side section 212 can extend all the way down to the lower surface 216 of the slider element 200 and thus not utilize a vertical base section such as base section 214 per se.

The slider element 200 is secured to the platform sections 64, 66, 202, and 204 by a hardware member, for example, in the form of bolt 217, extending through a washer 218 and then through a close-fitting through-hole 220 formed in the slider element. A nut or other type of fastener, not shown, may be used to engage the bolt 217 from beneath the platform sections 64, 66, 202, and 204. A counterbore 222 is formed above through-hole 220 to receive the head of the bolt 217 and position such head below the top surface 210 of the slider element. In installed position, the top surface 210 of the slider element is preferably essentially level with or slightly below the conveying surface as defined by the various rollers utilized on the loader.

The slider element can be composed of numerous types of materials, including high-density plastic materials that exhibit low sliding or conveying resistance. One such material is PTFE, which is a relatively hard material with high wear resistance. This material is an organic polymer having high molecular mass. The plastic material utilized to form the slider element 200 may include a reinforcement or filler material, as well as an exterior coating. The filler can have lubricating properties.

It will be appreciated that the angled or sloped side surface 212 of the slider element will force the edges of a bent or sagging ULD upward to prevent such edges from getting stuck or hanging up on the slider element. Moreover, the relatively large flat top 210 of the slider element 200 provides a relatively large bearing area to support the ULD without significant risk of damage or wear on the bottom of the ULD. Further, the relatively straightforward construction of the slider element 200, not requiring any moving parts, reduces the susceptibility of the slider element to damage, wear, or contamination.

The slider element 200 can be constructed of various sizes. For example, the slider element may have a base diameter in the range from about 3 to about 7 inches and the diameter of the top surface 210 can be from about 1½ to 3½ inches. Further, the radius of curvature of the side section 212, if in the form of a truncated dome, could be in the range of 1 inch to about 5 inches, again depending in part on the overall diameter of the slider element 200.

Next, referring to FIGS. 1, 2, 13, 14, and 15, the control platform 68 is illustrated as mounted along the side of the forward platform section 66. The control platform includes a telescoping deck portion 300 composed of the rearward stationary section 302 and a forward telescoping section 304. Control console 70 is mounted on the stationary section 302. The rear, outward side and forward end of the deck platform is bounded by railing structure 306 that accommodates the extension retraction of telescoping section 304. The railing structure 306 includes a forward section 308 composed of upright posts 310 extending upwardly from the end of the deck of telescoping section 304. A transverse intermediate cross rail 312 interconnects the posts 310 intermediate their heights, and a top cross rail 314 interconnects the upper ends of posts 310. A retractable side guardrail 316 is pivotal between a storage position shown in FIG. 13 to extend generally parallel to the forward section 308 of the rail structure to swing approximately 270° to assume the extended position shown in FIGS. 14 and 15.

The purpose of the side guardrail 316 is to form a barrier in the lateral direction of the loader 54 adjacent the fuselage F of the aircraft. The side guardrail 316 seeks to simulate or correspond to the exterior circumferential shape and curvature of the fuselage F along the side portion of the loader 54. In this regard, see FIG. 15. To this end, side guardrail 316 includes a railing section 320 that extends downwardly and forwardly relative to the loading platform 50. Though the railing section 320 is illustrated as composed of a straight segment, the railing section could be curved or could be composed of multiple segments. The side guardrail 316 also includes a shorter upper section 322 projecting transversely from post 310, and a longer lower section 324 generally parallel to upper section 322 and longer in length so as to meet the lower end of the downward rail section 320. A lower vertical rail section 326 is interposed between downward section 320 and lower section 324. However, the lower section 326 can be incorporated into the downward section 320.

Figure 15:
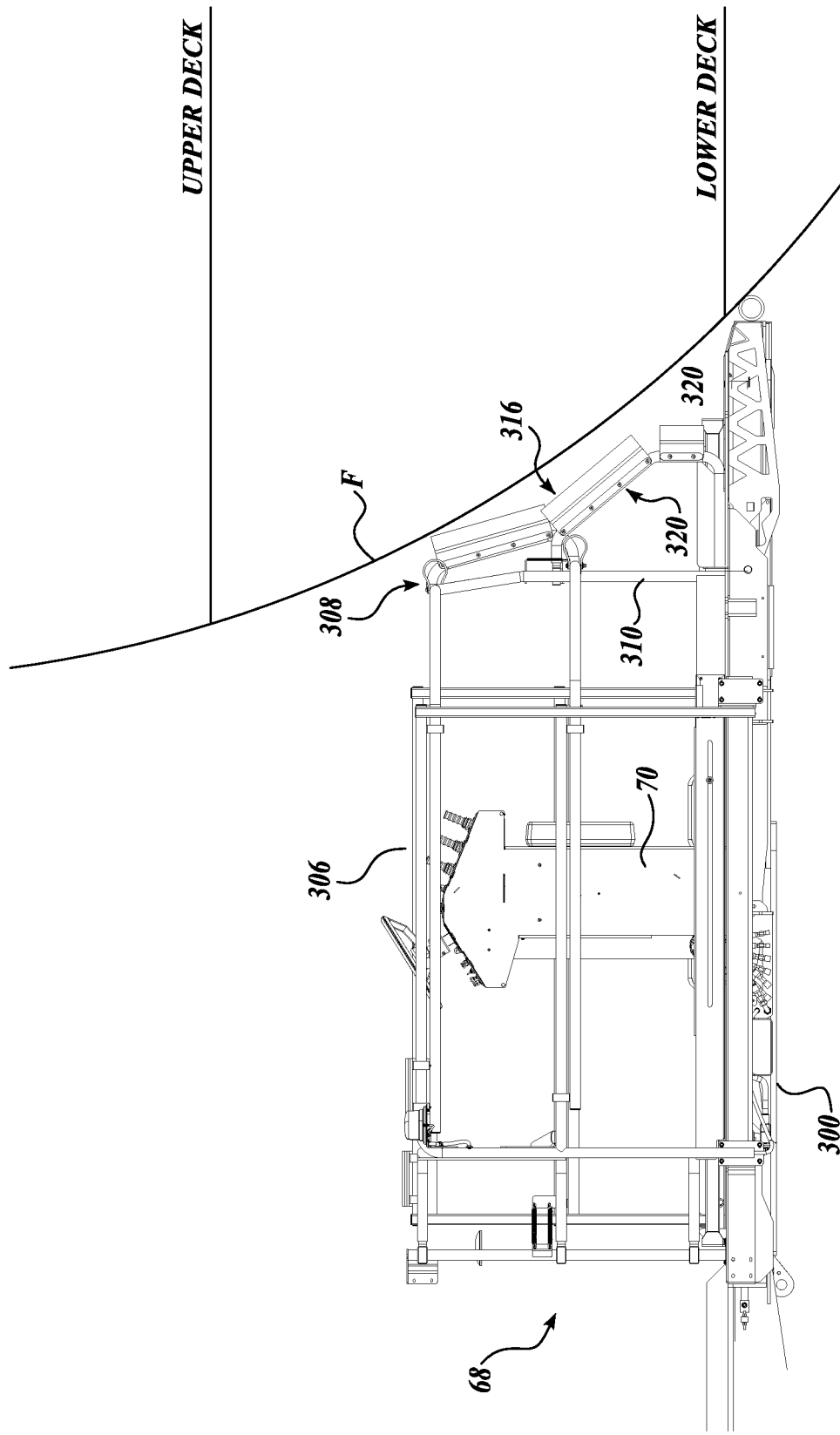
FIG. 15 is an elevational view of a portion of the cargo platform illustrating the walkway disposed in extended position closely adjacent the exterior of an aircraft fuselage at an elevation below the water line of the aircraft.
Figure 16:
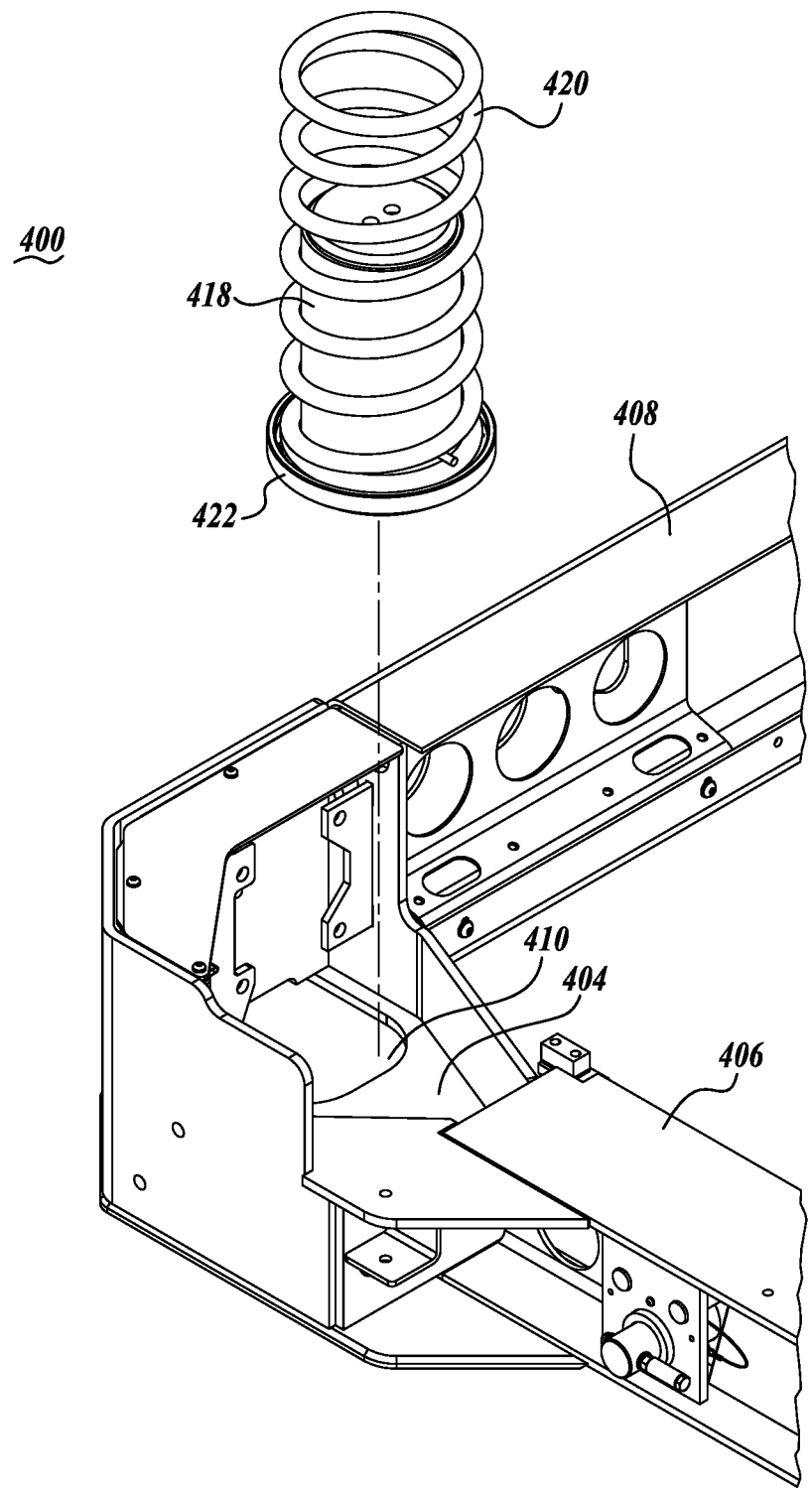
FIG. 16 is a fragmentary view of a portion of the loader frame of FIG. 1, illustrating the position of a helper lift assembly.
Figure 17:
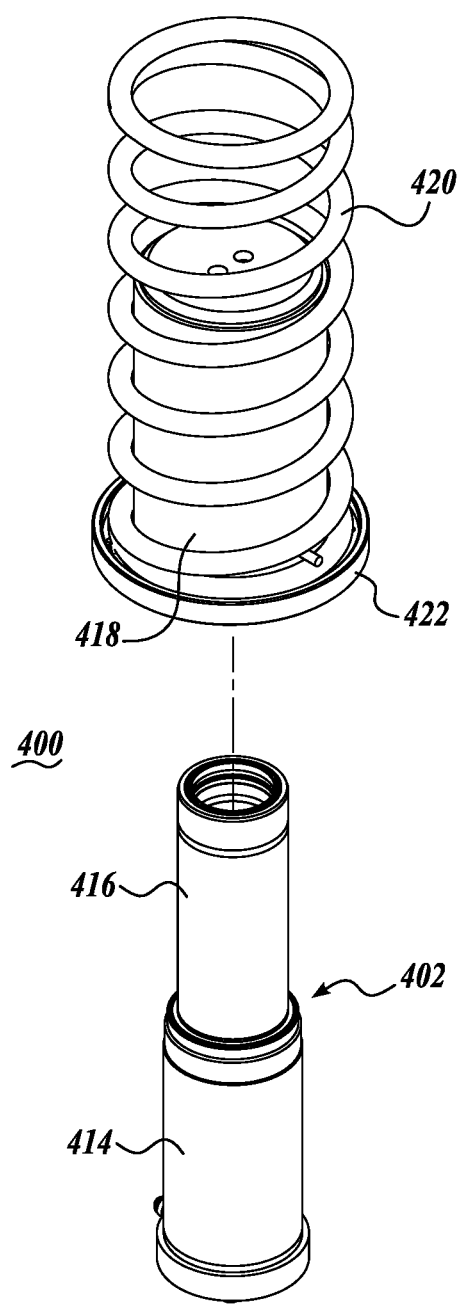
FIG. 17 is an exploded view of the helper lift assembly of FIG. 16.
Figure 18:
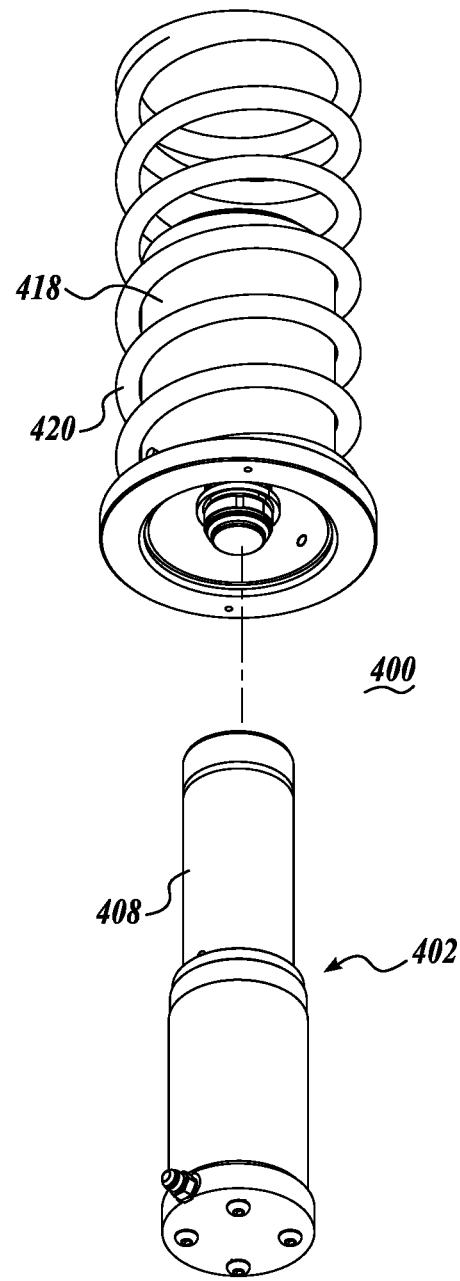
FIG. 18 is an isometric view of the helper lift assembly of FIG. 17, taken from beneath.
Figure 19:
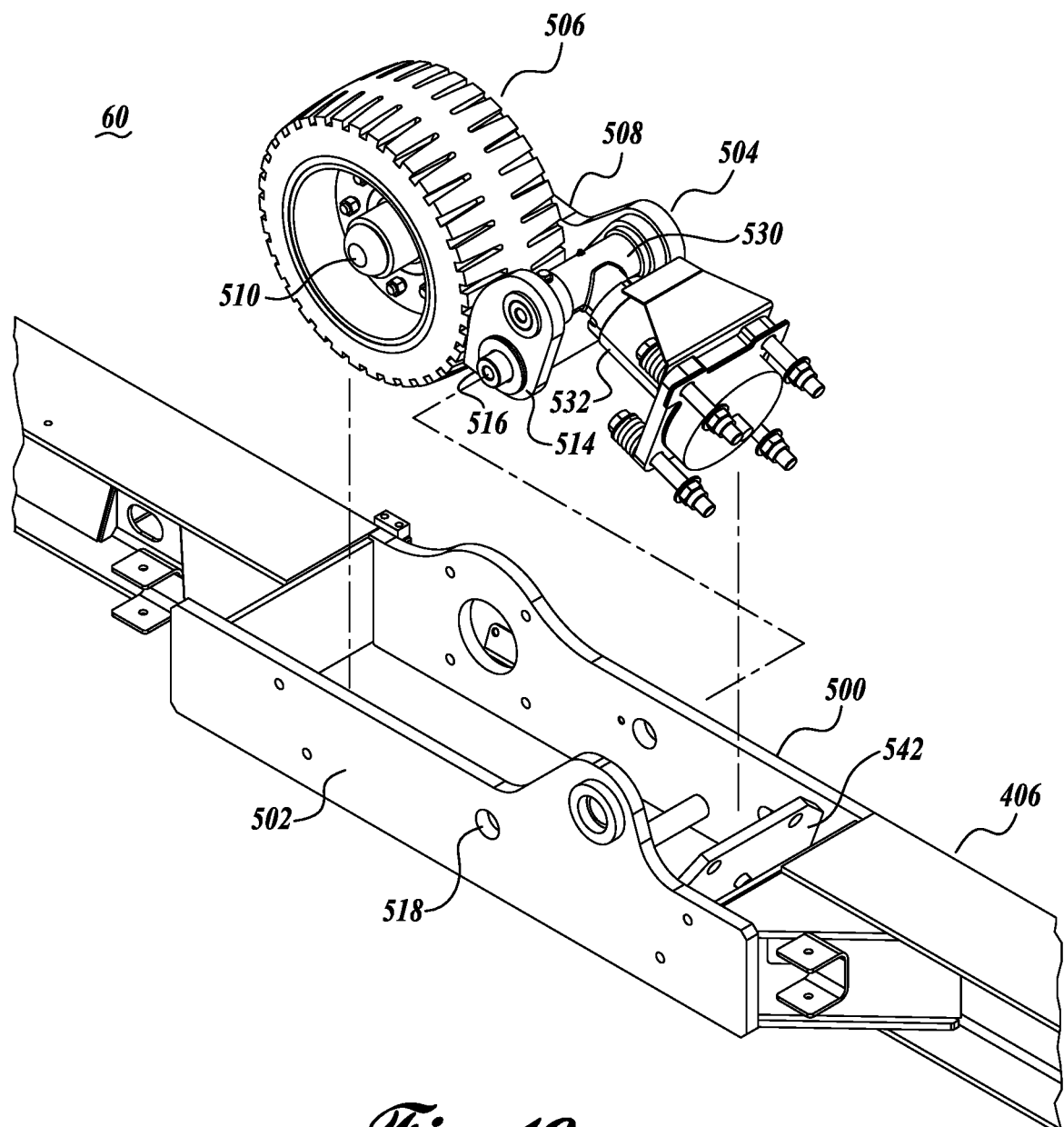
FIG. 19 is a fragmentary view of the loader frame of FIG. 1, illustrating the location of bogey wheels and associated suspension mounted to the frame.
Figure 20:
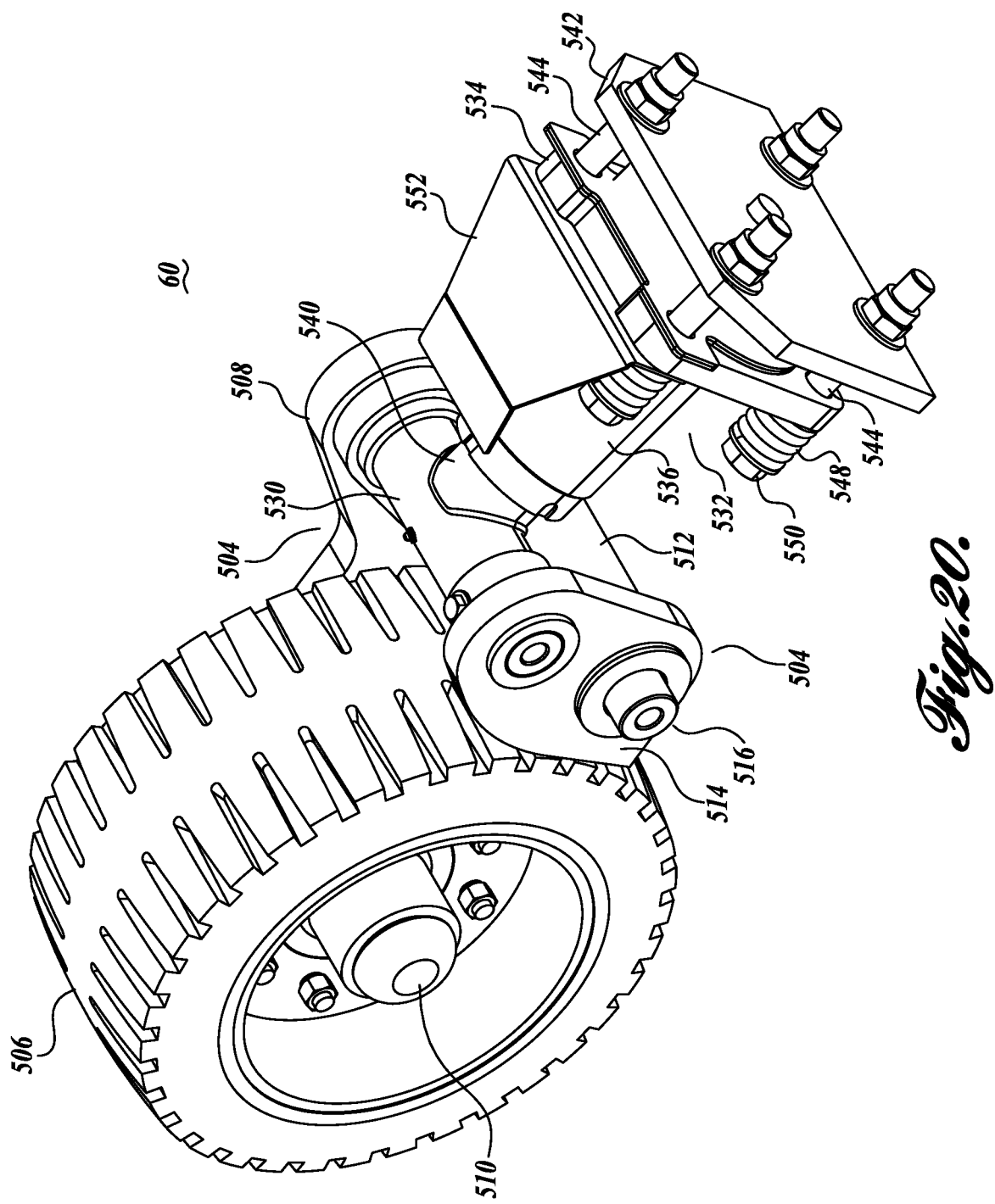
FIG. 20 is an isometric view of the bogey wheel and suspension of FIG. 19 from another orientation.
Figure 21:
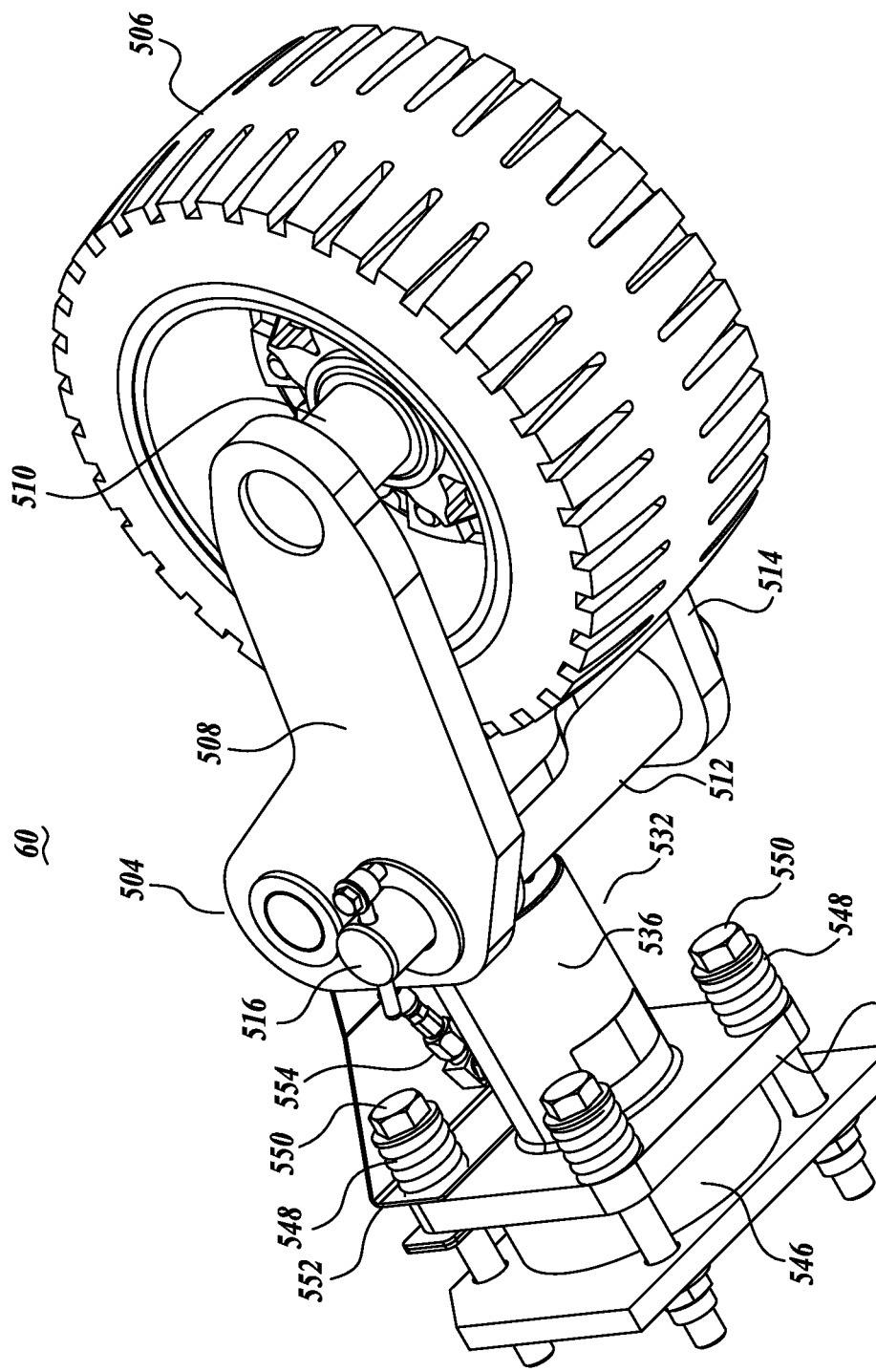
FIG. 21 is a further view of the bogey wheel and suspension of FIG. 19 shown from beneath.

The side guardrail 316 is connected or coupled to the post 310 in a manner that locks the side guardrail 316 either in retracted position as shown in FIG. 15 or extended position as shown in FIGS. 16 and 17. In this regard, a coupler 330 is interposed between post 310 and side guardrail 316 to enable the side guardrail to rotate between extended and stowed position but then be locked in place once the side guardrail is in either position. To this end, the couple 330 can be designed to enable the side guardrail 316 to be lifted in the upward direction for rotation between retracted and extended position and then lowered relative to the post 310, thereby locking the side guardrail into position.

Resilient pads or bumpers 340 are mounted on the intermediate and top cross rails 312 and 314, as well as on downward rail section 320, and further on lower rail section 326. Such pads can be of various constructions, including composed of a resilient, compressible elastic material, a foamed material, a flexible resilient sheet material rolled over, etc. Moreover, the pads 340 can be mounted on the railing structure and side guardrail 316 in any appropriate manner, including through the use of hardware members.

As shown in FIGS. 1 and 2, a railing structure 350 can be located on the opposite side of the loading platform forward section 66 from the location of the control platform 68. The railing section 350 may utilize a forward side guardrail 352 that is constructed similarly to the side guardrail 316 described above. As such, the description of the side guardrail 352 need not be repeated.

Next, referring to FIGS. 1, 2, and 16-18, as noted above, loading platform 50 is raised and lowered relative to underlying frame 52 by a lift system. As noted above, typical lift systems are not able to apply significant upward force when the loading platform is in fully lowered position or nearly so. As a consequence, the loader 54 utilizes an auxiliary lift system 400 for assisting in the lifting of the loading platform 50 relative to frame 52 when the platform is in lowered position. The auxiliary lift system 400 includes linear actuators 402 positioned in the rear corners of the frame rear section 62. In this regard, corner brackets 404 located at the intersection of the frame side rails 406 and frame rear cross rail 408 have an opening 410 formed therein for receiving the lift system 400 therethrough.

The linear actuator 402 can be of a multi-stage telescoping construction, for example, composed of two or three telescoping sections, such as sections 414 and 416 shown in FIG. 17. A cylindrical cover 418 is attached to the upper telescoping section 416 to travel upwardly and downwardly with the telescoping section 416. The outer diameter of the cover 418 is sized to closely engage the inside diameter of a compression spring 420. The cover 418 is constructed with the lower circular flange 422 that serves as a seat for the lower end of the spring 420. The spring 420 is sized to nominally extend above the upper surface of the cover 418. The upper end of the compression spring 420 bears against the underside of loading platform 50 when the loading platform is lowered sufficiently relative to the frame 52.

In operation, the linear actuator 402 provides a large lifting force during the initial upward lifting of the loading platform 50. As the platform 50 is raised by the actuator 402, the main lift cylinders, discussed above, gain better mechanical advantage and are able to contribute more to the total lifting force. Thus, when the linear actuators 402 reach the end of their stroke, the required helper force is at a sufficiently low level that the compression springs 420 are able to extend and provide additional lifting force against the loading platform 50.

Moreover, when the lifting platform 50 is lowered, the springs 420 are contacted first by the platform to compress the springs. This slows the downward travel of the platform and reduces the impact force against the linear actuators 402.

Although two linear actuators 402 are illustrated, the number of linear actuators may be fewer or greater as required. Moreover, in the auxiliary lift system 400, the linear actuators 402 are illustrated as mounted on the underlying frame 52. However, the linear actuators may instead be mounted to the underside of the lift platform 50 with the springs 420 extending downwardly against the frame 52.

Further, the linear actuators 402 may be in the form of a fluid actuator, such as a hydraulic multi-stage cylinder. However, other types of fluids, including air, may be utilized as the operating medium for the linear actuator. Alternatively, other types of linear actuators may be employed, such as electrical or piezoelectrical actuators.

Next, referring to FIGS. 1, 2, 19, 20, and 21, a bogey suspension system 60 is utilized in conjunction with loader 54. A suspension system is mounted between interior frame side plate 500 and exterior side plate 502 positioned along frame side rails 406. The suspension system 60 includes a swing arm assembly 504 that interconnects wheel 506 to the side plates 500 and 502. In this regard, the swing arm assembly 504 includes an elongated pivot arm 508 that extends from the wheel axle 510 to a cross brace 512 that extends laterally from the pivot arm 508 to a shorter parallel pivot arm 514. Stub shafts 516 project outwardly from the pivot arms 508 and 514 to engage through close-fitting openings 518 formed in the side plates 502 and 504. The swing arm assembly 504 rotates about the openings 518.

The swing arm assembly 504 also includes a transverse pivot shaft 530 spanning across between pivot arm 508 and arm 514 parallel to the stub shafts 516. A shock absorber 532 or similarly operating component transversely extends from the pivot shaft 530 to an end plate 534. The shock absorber 532 includes an outer cylinder portion 536 and an interior cylinder rod portion 540, the distal end of which is fixed to pivot shaft 530. The end plate 534 is bolted to frame cross plate 542 by hardware members in the form of bolts 544 that capture a resilient snubber member 546 therebetween. Compression springs 548 are engaged over bolts 544 and compressed between the heads 550 of the bolts 544 and the adjacent face of end plate 534. In addition, a formed top shield 552 is held in place by the upper two bolts 544 to protect fluid fittings 554 disposed on the upper side of the shock absorber cylinder portion 536.

The shock absorber 532 can be part of an active suspension system wherein fluid is introduced into the cylinder portion 536 to rotate the swing arm 504 thereby to raise the frame 52 relative to the ground. Alternatively, fluid may be removed from the shock absorber to lower the frame 52 relative to the ground. Moreover, the pressure of the fluid within the cylinder 536 may be altered to vary the ride characteristics of the suspension system.

In addition, vibration and low-level forces on the wheel 506 may be absorbed by the snubber 546, composed of a resilient elastomeric material that is capable of absorbing shock loads. Such material may include natural or synthetic rubber or similar dampening/resilient materials. One non-limiting example is 75-durometer rubber. The springs 548 control or limit the rebound of the end plate 534 relative to the snubber 546.

It should be appreciated that the suspension system 60 may increase the life of the loader 54 and particularly frame 52 to reduce the shock loads imposed thereon during travel of the loader about an airport, especially if travel occurs over rough surfaces and/or at high speeds. In addition, the comfort and safety of the loader operator are improved. Further, the suspension system may enable the loader 54 to travel at higher speeds from place to place while still reducing shock loads on the loader during travel.

While illustrative embodiments have been illustrated and described, it will be appreciated that various changes can be made therein without departing from the spirit and scope of the invention. In this regard, rather than utilizing a loading platform 50 composed of a rear section 64 and a separate forward section 66, the platform could be composed of a single structure or section. In addition, the static slider elements 200 may be located elsewhere on the loading platform other than along deck side sections 82, 84, 202, and 204. For example, the static slider elements may be located in the central or main deck section 80 of the platform rear section, as well as similarly positioned in the platform forward section 66.

The invention claimed is:

1. An aircraft loader for transferring loads into and out of an aircraft, comprising:
   (a) a ground-engaging frame;
   (b) a loading platform adapted to raise and lower relative to the frame;

(c) wherein the loading platform comprises an upper deck having a top surface; and (d) a plurality of static, upwardly convex-shaped cargo slider elements disposed on the upper deck of the loading platform to project above the upper deck to present a static contact support surface to contact against and support loads carried by the loading platform and facilitate movement of the loads about the loading platform.

2. The aircraft loader of claim 1, wherein the upwardly convex-shaped cargo slider elements comprise a static upper surface disposed substantially parallel to the top surface of the upper deck of the loading deck to define a bearing surface for bearing against loads being transferred.

3. The aircraft loader of claim 1, wherein the cargo slider elements are in the shape selected from the group including a truncated dome, a truncated dome with a base, a truncated cone, and a truncated cone with a base.

4. The aircraft loader of claim 3, wherein the radius of curvature of the truncated dome-shaped cargo slider elements is in the range of about 1 inch to about 5 inches.

5. The aircraft loader of claim 1, wherein the cargo slider elements having portions defining a central opening for receiving an attachment member to attach the slider elements to the deck of the loading platform.

6. The aircraft loader of claim 5, wherein the central opening extends the full height of the slider elements.

7. The aircraft loader of claim 1, further comprising roller assemblies projecting above the upper deck to support loads carried by the loading platform and facilitate movement of the loads about the loading platform.

8. The aircraft loader of claim 7, wherein the roller assemblies project above the upper deck to an elevation substantially equal to or slightly above the elevation of the slider elements.

9. An aircraft loader for transferring loads into and out of an aircraft comprising:

a load carrying deck having a top surface; and a plurality of static, upwardly convex-shaped cargo slider elements disposed on the deck to project above the deck top surface, to present a static contact support surface, to contact against and support loads carried by the loader and facilitate movement of the loads about the deck.

10. The aircraft loader of claim 9, wherein the upwardly convex-shaped cargo slider elements comprise a static upper surface disposed substantially parallel to the top surface of the deck to define a static bearing surface for bearing against and supporting loads being transferred.

11. The aircraft loader of claim 9, wherein the static contact surface of the cargo slider elements having shape selected from the group including a truncated dome, a truncated dome with a base, a truncated cone, and a truncated cone with a base.

12. The aircraft loader of claim 11, wherein the radius of curvature of the truncated dome is in the range of about 1 inch to about 5 inches.

13. The aircraft loader of claim 9, wherein the cargo slider elements having portions defining a central opening for receiving an attachment member to attach the cargo slider elements to the deck.

14. The aircraft loader of claim 13, wherein the central opening extends the full height of the cargo slider elements.

15. The aircraft loader of claim 9, wherein the cargo slider elements further comprising a base section for mounting the cargo slider elements to deck.

16. The aircraft loader of claim 15, wherein the base section is of a diameter of from 3 to 7 inches.

\* \* \* \* \*